US008995633B2

(12) United States Patent
Gore

(10) Patent No.: US 8,995,633 B2
(45) Date of Patent: Mar. 31, 2015

(54) SYSTEM AND METHOD FOR CREATING A ROUTING MATRIX FOR ROUTING LOCAL CALLS

(75) Inventor: Michelle Gore, Arvada, CO (US)

(73) Assignee: Level 3 Communications, LLC, Broomfield, CO (US)

(*) Notice: Subject to any disclaimer, the term of this patent is extended or adjusted under 35 U.S.C. 154(b) by 1120 days.

(21) Appl. No.: 12/544,179

(22) Filed: Aug. 19, 2009

(65) Prior Publication Data

US 2011/0044445 A1    Feb. 24, 2011

(51) Int. Cl.
*H04M 3/42* (2006.01)
*H04Q 3/66* (2006.01)
*H04Q 3/545* (2006.01)

(52) U.S. Cl.
CPC .............. *H04Q 3/66* (2013.01); *H04Q 3/54566* (2013.01); *H04M 3/4228* (2013.01)
USPC ................................ 379/114.12; 379/114.02

(58) Field of Classification Search
USPC ............. 379/220.01, 221.02, 201.01, 114.12; 370/351
See application file for complete search history.

(56) References Cited

U.S. PATENT DOCUMENTS

| 6,560,218 | B2 | 5/2003 | McAllister et al. | |
| 6,961,334 | B1* | 11/2005 | Kaczmarczyk | 370/354 |
| 7,289,490 | B1 | 10/2007 | Kalmanek et al. | |
| 2002/0196919 | A1* | 12/2002 | Ruckart et al. | 379/121.02 |
| 2005/0250501 | A1 | 11/2005 | Mobin et al. | |
| 2009/0109959 | A1 | 4/2009 | Elliott et al. | |

OTHER PUBLICATIONS

International Search Report from WIPO, International Application No. PCT/US10/46039, International Filing Date Aug. 19, 2010, Date of mailing ISR Oct. 14, 2010, 3 pages.
Written Opinion, International Application No. PCT/US10/46039, International Filing Date Aug. 19, 2010, Date of mailing Written Opinion Oct. 14 2010, 6 pages.
"International Preliminary Report on Patentability, dated Mar. 1, 2012", PCT/US10/46039, filed Aug. 10, 2010, 8 pgs.

* cited by examiner

*Primary Examiner* — Rasha Al Aubaidi

(57) ABSTRACT

A method includes gathering local call attributes from a call detail record capture utility, linking supplemental attributes to the local call attributes; and generating a local call report, which associates local call routes with a plurality of attributes. A system includes an electronic cost administrator operable to gather call detail records identifying a plurality of calls set up throughout a network and associate a cost with each identified call, a trunk group inventory storing a plurality of local trunk groups that calls can be terminated on, and a local call optimal cost routing matrix generator operable to retrieve selected call setup data from the electronic cost administrator, identify local calls using the trunk group inventory and generate an optimal cost routing matrix associating a plurality of local calls with local routes in a prioritized manner.

14 Claims, 5 Drawing Sheets

SYSTEM AND METHOD FOR CREATING A ROUTING MATRIX FOR ROUTING LOCAL CALLS

COPYRIGHT NOTICE

Contained herein is material that is subject to copyright protection. The copyright owner has no objection to the facsimile reproduction of the patent disclosure by any person as it appears in the Patent and Trademark Office files or records, but otherwise reserves all rights to the copyright whatsoever. Copyright© 2009 Level 3 Communications, LLC.

BACKGROUND

In the field of telecommunications, telephone calls can be designated as local or long distance. When calls are set up through a network, they are set up through numerous different network devices to establish the connection between the calling telephone and the called telephone. Generally there may be multiple paths (routes) through a network over which calls can be set up and there is generally a cost associated with each route. A particular route is selected to set up each call based on a number of factors. In conventional systems, in the case of local calls in particular, the route selection has been "hard coded" in advance.

For example, for local calls, network personnel determine in advance how local calls should be routed through the network. The network personnel then configure the network equipment in a static way ("hard coded") to route the calls according to their predetermined route choices. Sometimes, these predetermined, "hard coded" settings are not optimal in terms of any number of criteria, such as routing cost. When a call is received at a network ingress point, the hard coded settings dictate how the call will be routed through the network, regardless of current network or business conditions. As such, the selected route may not be the least costly route for setting up the call.

Furthermore, conventional systems lack the ability to view routing operations of network devices, such as switches. Such visibility into routing operations could be used by network operators to better understand network routing statistics, which can in turn impact network management decisions. Unfortunately, local routing statistics are not currently being gathered and presented in a way that is useful for making knowledgeable network management decisions.

Accordingly, particularly in the case of local call routing, the conventional route designation process is manual, and does not take into account current conditions such that calls are routed in an optimal (e.g., least cost) fashion. Network call setup devices are relatively inflexibly configured and do not adjust routing based on network dynamics. In addition, conventional systems do not provide visibility into local call routing statistics.

SUMMARY

Embodiments of systems and methods presently disclosed generally relate to analyzing local call routing. More specifically, embodiments relate to identifying local calls among a set of calls routed through a network and associating local call area code/local exchange codes (NPA-NXX's) with one or more attributes. Example attributes include cost, minutes of use (MOUs), vendors, terminating switches, and others. Further still, embodiments relate to generating a local call optimal cost routing matrix based on determined local call route costs. Further yet, embodiments relate to notifying specified personnel of the local call route attributes.

An embodiment of a computer-implemented method for analyzing locally routed phone calls includes retrieving call routing information from an electronic cost routing administrator operable to collect call detail records from a plurality of network elements in a network. The call routing information indicates how a plurality of calls were terminated through the network. The method further includes retrieving call setup costs associated with a plurality of calls from the electronic cost routing administrator operable to attribute costs to the plurality of calls setup up across a network. The method further includes retrieving local trunk groups from a local trunk group inventory, associating vendor types with calls identified in the call routing information and associating local trunk groups with calls identified in the call routing information. Further still, the method includes generating one or more views of local calls setup through the network, based on the local trunk groups, the call setup costs and the vendor types. A local call route view may be in the form of a table, graph, chart, or other presentation.

Further still, the view may associate area code/local exchange numbers (NPA-NXX's) with terminating trunk groups, terminating vendors, and call setup costs. The view may further include minutes of use and partition identifiers. The method may further include generating an optimal cost routing matrix identifying a plurality of routes for a plurality of calls in a prioritized manner. The computer-implemented method may further include provisioning the plurality of network elements with routes from the optimal cost routing matrix to enable prioritized optimal cost local routing of calls.

An embodiment of a system for routing local calls through a network includes an electronic cost administrator operable to gather call detail records identifying a plurality of calls set up throughout a network and associate a cost with each identified call, a trunk group inventory storing a plurality of local trunk groups that calls can be terminated on, and a local call optimal cost routing matrix generator operable to retrieve selected call setup data from the electronic cost administrator, identify local calls using the trunk group inventory and generate an optimal cost routing matrix associating a plurality of local calls with local routes in a prioritized manner.

An embodiment of the system may further include a local mapping utility operable to map area code/local exchange numbers (NPA-NXX's) to other NPA-NXX's that constitute local calls. The system may further include a vendor type table that associates vendor types with terminating vendor identifiers of the CDRs.

Still further, in an embodiment of the system, the optimal cost routing matrix may associate each of a plurality NPA-NXX's with one or more costs and routes in a prioritized manner. The system may further include one or more network elements, wherein routes of the optimal cost routing matrix are provisioned onto the one or more network elements. The system may further include an override inventory storing one or more override routes for each call, wherein each of the one or more overrides is an alternative route irrespective of route cost.

An embodiment of a computer program product includes computer-readable media having stored thereon computer-executable instructions, which, when executed by a computer cause the computer to carry out a process. An embodiment of the process includes gathering local call attributes from a call detail record capture utility, linking supplemental attributes to the local call attributes, and generating a local call report, which associates local call routes with a plurality of attributes.

In an embodiment of the computer program product, linking supplemental attributes to the local call attributes includes linking area code/local exchange numbers of local calls with associated vendor names, route costs and trunk group identifiers. The process may further include determining minutes of use associated with each of a plurality of local call routes. The process may further include generating a local call optimal cost routing matrix based on the associations between local call route costs and local call attributes.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
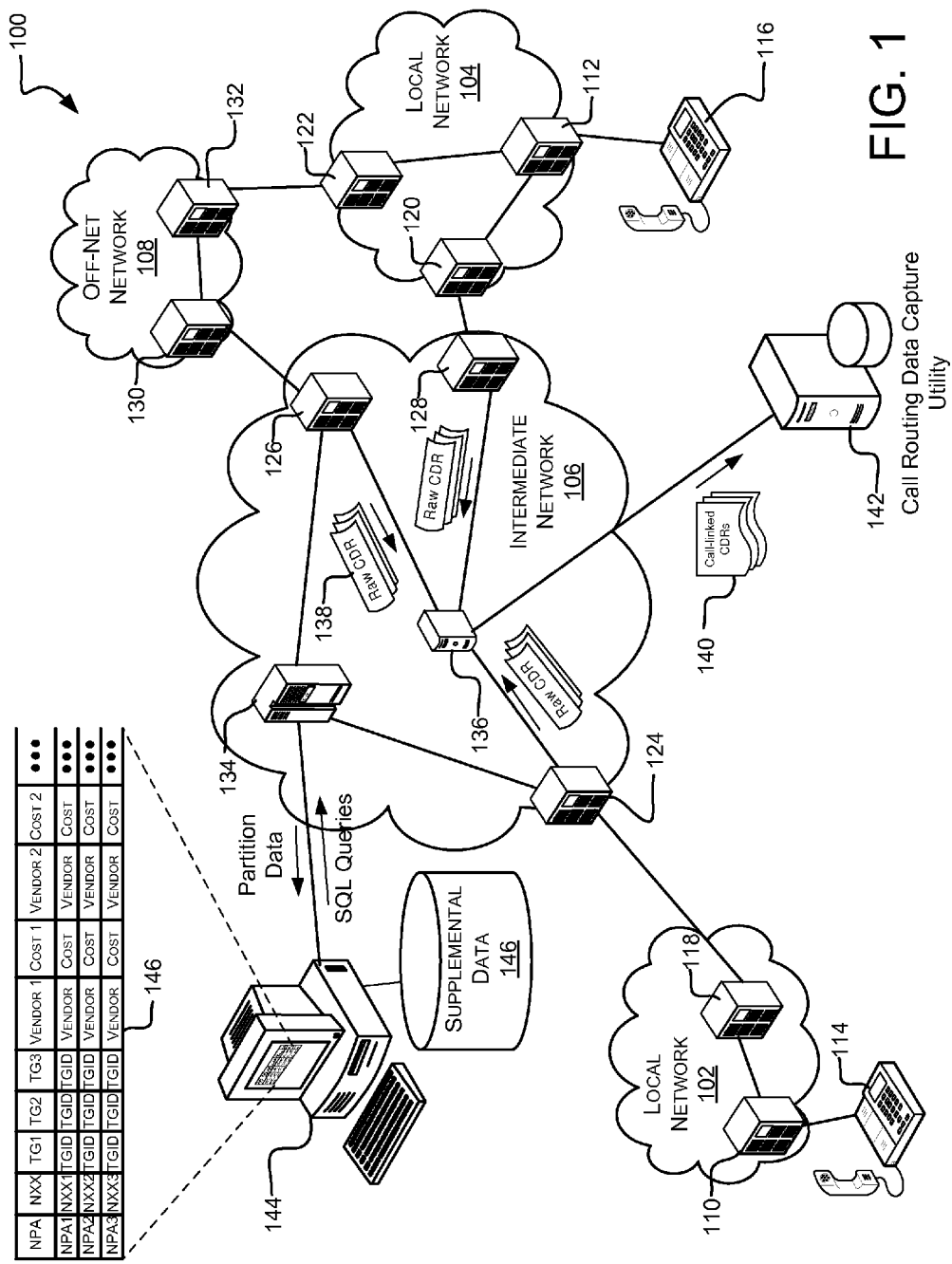
FIG. 1 illustrates an example network environment suitable for setting up calls, gathering call detail record (CDR) data, and analyzing local call routes based on the CDR data and one or more sets of supplemental data.

Embodiments of systems and methods presently disclosed generally relate to linking related data units from disparate sources of local call routing data to generate a single local call routing analysis. More specifically, embodiments relate to capturing local call routing data from local calls that have actually been set up and associating the captured local call routing data with local call data derived from business rules. More specifically still, associating captured local call routing data with business rules-derived data can involve linking local route costs with every pair of local area code/local exchange code (NPA-NXX). Such route-to-cost links can be used to generate a local route matrix, such as an optimal cost routing matrix (OCRM).

In communications networks that set up calls between originating and destination endpoints (or between other networks that set up calls), there may be numerous routes that each call could take to reach the destination endpoint (e.g., called number). The route selection may be based on numerous factors, such as route availability at the time the call is placed, as well as preconfigured settings in network devices, such as switches, that set up the call. The network devices (e.g., switches), or network elements, are configured in advance to set up calls along certain routes, such as trunks, or to certain vendor networks. The routing configurations of network elements may designate a number of routes in order of priority. The order of the routes is typically set in advance and may be based on business considerations, such as vendor agreements and route costs.

Call routing information is available in the form of call detail records (CDRs) generated by network elements. CDRs typically include the calling number, the called number, the charged number, the call duration, terminating switch, terminating vendor identifier (ID), and other data. There may be tens, hundreds or more network elements in a network that generate CDRs describing each call, or a leg of each call. The CDR data indicates the route over which each call was set up. From CDRs, numerous metrics and routing parameters can be determined for calls that have been set up, such as minutes of use (MOUs), terminating and originating switches, and terminating vendor.

Embodiments of the present invention relate to systems and methods for gathering local call routing data from disparate sources and linking the data to form a single data set useful for local call routing analysis. For example, originating and terminating area codes/local exchange codes (NPA-NXX's), terminating vendor identifiers, and minutes of use can be obtained from a data capture utility, which can be linked to vendor types, local route costs and LERG switch data. The linked data can be tabulated and used to generated reports for network personnel. With actual local route costs linked to local routes by NPA-NXX, network personnel can readily determine whether local calls are being routed in an optimal manner according to cost. Network personnel can readily determine if network element configuration changes can be made to reduce local call routing costs.

Embodiments of systems and methods are operable to create one or more views of local call routing that is actually occurring in a network. These views may be tabular presentations that show numerous aspects of local calls that have been routed. The local route views can indicate the physical configuration of one or more switches involved in local call routing (e.g., provisioning data that is loaded in the switch(es)). Because the view is automatically generated, network personnel do not need to physically go to the switch site, or otherwise manually investigate the switch, in order to understand the switch's configuration. Often, network personnel do not have the acumen to perform such investigations to determine switch configurations. In addition, such manual switch setting investigations are tedious because they require a trunk-group by trunk-group investigation. As such, the local call views automatically presented by embodiments of systems and methods described herein can save time and work effort.

In addition to presenting local call route views, embodiments may use cost data determined for locally routed calls to generate an optimal cost routing matrix (OCRM) for local call routes. The local route OCRM indicates one or more routes for each combination of originating area code/local exchange code (NPA-NXX) and destination NPA-NXX. The local route OCRM can be used to adjust configuration settings for network elements (e.g., switches). Adjustment of network element configurations based on the local route OCRM may be manual or automatic or a combination of both.

An embodiment includes a local route analysis system and a call routing data capture system. The local route analysis system and the call routing data capture system may be combined into a single system. A local route management (LRM) system may also be included, which can be used to configure network elements based in part on analysis performed by the local route analysis system. The local route analysis system, call routing data capture system and LRM system may be located in one or more network operation centers (NOCs), which may be in communication with network elements of the call routing network.

Local route analysis and example applications are described with respect to an example operating environment, such as a network environment 100, shown in FIG. 1. The network environment 100 includes a number of distinct networks, such as a first local network 102, a second local network 104, an intermediate network 106 and an off-net network 108. In general, the intermediate network 106 sets up calls between the first local network 102 and the second local network 104, and may use the off-net network 108 to facilitate call setup. Calls setup by the intermediate network may be local and/or long distance. Embodiments of systems described herein relate to local call routing analysis.

First local network 102 and second local network 104 serve as call origination and destination networks. For example, first local network 102 and second local network 104 have network elements, such as local exchange 110 and local exchange 112, which are typically located at end offices (not shown) that are proximate to communication endpoints, such as telephone 114 and telephone 116. Although the communication endpoints 114 and 116 are illustrated as desktop telephones, it will be appreciated that communication endpoints 114 and 116 may be any communication device configured to connect to local networks 102 and 104, respectively. By way of example, but not limitation, communication devices may include cell phones, voice over IP phones, soft phones (i.e., computer-based phones) or others.

Local networks 102 and 104 also include other network elements, such as switch 118 and switch 120, respectively, for routing calls to, and receiving calls from, the intermediate network 106. Switch 118 and switch 120 may be, for example, Class 4 or tandem switches, which are typically configured for interconnection with other networks. In addition, a local network, such as local network 104 may include other switches, such as switch 122, which can route calls to, and receive calls from, the off-net network 108.

Sometimes calls being set up by the intermediate network 106 are set up indirectly to local network 104 via the off-net network 108. Off-net network 108 may be owned and managed by a vendor of call routing services. The vendor may have agreements with the owner of the intermediate network 106, whereby calls are routed to the off-net network 108. Like other calls set up through the intermediate network 106, such off-net routing of calls is recorded in CDRs as discussed further below.

As mentioned earlier, the intermediate network 106 sets up calls through the network 106 between the local networks 102, 104 and/or off-net network 108. To perform call setup, the intermediate network 106 includes network elements, such as switch 124, switch 126 and switch 128. Switch 124, 126 and 128 may be Class 5 or softswitches, as are known in the art. As such, switch 124, 126, and 128 handle call control and signaling associated with setting up calls. Switch 124, 126, and/or 128 can typically allow for, or provide, one or more other functions related to call setup, including protocol conversion (e.g., between packet switched and circuit switched), centralized control of multiple switching platforms, Quality of Service (QoS) and Grade of Service (GoS).

The intermediate network 106 may span a geographic area larger than the geographic area spanned by the local networks 102 and 104. The intermediate network 106 may be a long-haul network, for example. In this regard, the intermediate network 106 includes a geographically distributed infrastructure of network elements and channels (e.g., fiber optic cables, copper wire and/or others) for carrying call signaling data over potentially large distances. As such, the intermediate network 106 is operable to set up calls between multiple local regions or metropolitan areas. Local network 102 and local network 104 may, for example, be situated in or around distinct metropolitan areas, where local network 102 and local network 104 can handle local call origination and termination (i.e., setup).

In addition, intermediate network 106 is operable to set up calls within local regions (i.e., local calls). For example, local network 102 and local network 104 may be within the same local region. Whether a call between two numbers is considered local or not can be determined with a query to an HTLT database which is known in the art to maintain sets of NPA-NXX pairs which represent local calls.

Continuing with the prior example call setup, a call setup request received by switch 124 from switch 118 may be sent to switch 126. From switch 126, the call setup request can be sent to another network element, such as switch 130 of the off-net network 108. The switch 130 can send the call setup request to another switch 132 in the off-net network 108, which can terminate the call from the off-net network 108 to switch 122 of the local network 104. The call setup request can then be sent to switch 112, which can terminate the call to the endpoint 116.

Terminating a call refers to setting up a final leg (the egress leg) of a call before the call leaves a network. The switch device that handles the termination of the call from the network is referred to as the terminating switch. In this regard, for example, when switch 128 sets up call to switch 120, switch 128 is considered the terminating switch associated with setting up the call by the intermediate network 106. The call can be terminated via a number of trunk groups connected to the switches. As such, in general when a call egresses the intermediate network 106 from switch 124, 126 or 128 to another network, the switch 124, 126 or 128 from which the call egresses the network 106 is considered the terminating switch associated with that call, with respect to the intermediate network 106.

For ease of illustration, FIG. 1 only shows a few network elements in each network. In actual operation, there are typically many more network elements and potentially numerous channels between the various networks. When the intermediate network 106 is setting up a call, a channel (e.g., a trunk) and a terminating switch are selected for setting up the call to another network. The selection of the terminating switch and channel are made based on route settings configured on the network elements. Different channels may have different call setup costs associated with them. For example, it may cost more to route a call directly to local network 104, rather than routing the call indirectly through off-net network 108. The local call analysis process described herein can determine costs associated with routing local calls on various trunks and to various vendors.

In one embodiment, network elements in the intermediate network 106 are configured using a softswitch/core routing engine (CRE) 134. The CRE 134 is a network element with memory and processing capability to manage routing among network elements within the network 106. The CRE 134 is configured with one or more route plans that associate terminating area code/local exchange codes (designated by NPA-NXX, which are the first six digits of a ten digit telephone number) with route labels that identify one or more routes that can be used for setting up calls to the terminating NPA-NXX.

The route plans in the CRE 134 can be organized according to partitions. A partition can be associated with a service level or customer service plan or jurisdiction used in routing calls. Partitions, route plans and configuration of the CRE 134 are discussed in detail in copending US Patent Publication No. 2009/0074173 and US Patent Publication No. 2009/0080630 both entitled "LOCAL ROUTING MANAGEMENT IN A TELECOMMUNICATIONS NETWORK", which have common assignee and which are both incorporated herein by reference for all purposes.

According to one embodiment, configuration data (e.g., route plans) from the CRE 134 are propagated to network elements (e.g., switch 124, switch 126 and switch 128) of the intermediate network 106. The network elements then set up calls according to the configuration data. When a network element sets up a leg of a call, the network element generates a call detail record (CDR) that includes a number of details about the call leg, such as the origination number, destination number, destination switch, and others. CDRs are constantly being created as call legs are set up.

In one embodiment, CDRs generated by the network elements are sent to a CDR collector 136. The CDRs sent to the CDR collector 136 include CDR data that is referred to as raw CDR data 138. The raw CDRs 138 from different network elements may be associated with different legs of the same call. The CDR collector 136 links CDRs related to different legs of the same call to generate a CDR related to the entire call. In this manner, CDRs related to the same calls are combined into call-linked CDRs 140. The CDR collector 136 may be a server computer or other computing device configured to link CDR data that is related by call.

At least a subset of call-linked CDRs 140 are sent to a CDR capture point, such as CDR capture server computer 142. CDR capture server computer 142 gathers CDR data from the call-linked CDRs 140 and organizes CDR data in tables, for example in a database. As is discussed further below with reference to FIG. 2, the CDR data tables are composed of many rows of CDR data, with each row including CDR attributes for a given call. Each call is assigned a call identifier (ID) associated with each call entry in the tables.

CDR data may be captured by the CDR capture server 142 repeatedly, on a substantially periodic basis, such as daily, weekly, bi-weekly, or otherwise. In one embodiment, the CDR capture server 142 captures CDR data 140 on a specified day each month. In this particular embodiment, over a month time period, hundreds of thousands or millions of calls may have been set up by network elements of the intermediate network 106. The CDR data at the CDR capture server 142 is unrefined, meaning that the data is not organized or formatted in a way that allows for quick and easy understanding of aggregated results of call routing through the network. In part because CDR data is listed on an individual call basis at the CDR capture server 142, a user would typically find it very difficult to discern the impact of how calls were routed during the prior given time period (e.g., week, month, etc.) on a larger scale.

Furthermore, the CDR data tables of the CDR capture server 142 are additionally difficult to read and understand for impact analysis because each call entry includes many (e.g., tens or hundreds) CDR attributes that are not necessarily important to a given analysis. The inclusion of many CDR attributes in the CDR data tables by the CDR capture server 140 can make quick and/or effective analysis of the data difficult if not impossible. In particular, the unrefined CDR data at the CDR capture server 142 alone make it difficult to identify local calls and analyze costs of routes used to terminate the local calls. Embodiments described below provide supplementing the unrefined CDR data with business and operations related data to identify local calls and determine costs associated with one or more routes used to setup those calls.

In one embodiment, a local route analysis and reporting computer 144 performs local route analysis using disparate data sets. The local route analysis computer 144 retrieves selected CDR attribute values from the call route data capture utility 142 and associates CDR attributes with other data from the CRE 234 and supplemental data 146. In one embodiment, the local route analysis computer 144 and the call routing capture utility 142 may be integrated into a single system. As discussed further hereinbelow, supplemental data 146 may include LERG data, route cost data, trunk group data, HTLT data, vendor types and others. Based on the various sources of data, the local route analysis computer 144 generates tables (e.g., table 148), reports and/or a matrix of local routes associated with various attributes of interest.

The lines connecting various devices (e.g., network elements or servers) in FIG. 1 are intended only to indicate that there is some form of communication link between the devices to assist in illustration, and do not imply any particular type of communication technology. The lack of a line between any two devices does not necessarily mean there is not a communication link between the devices. Indeed, there may be communication between numerous devices that are not connected with a line in FIG. 1. For example, although not shown, there is a communications path between the local call route analysis computer 144 and the call data capture utility 140.

Figure 2:
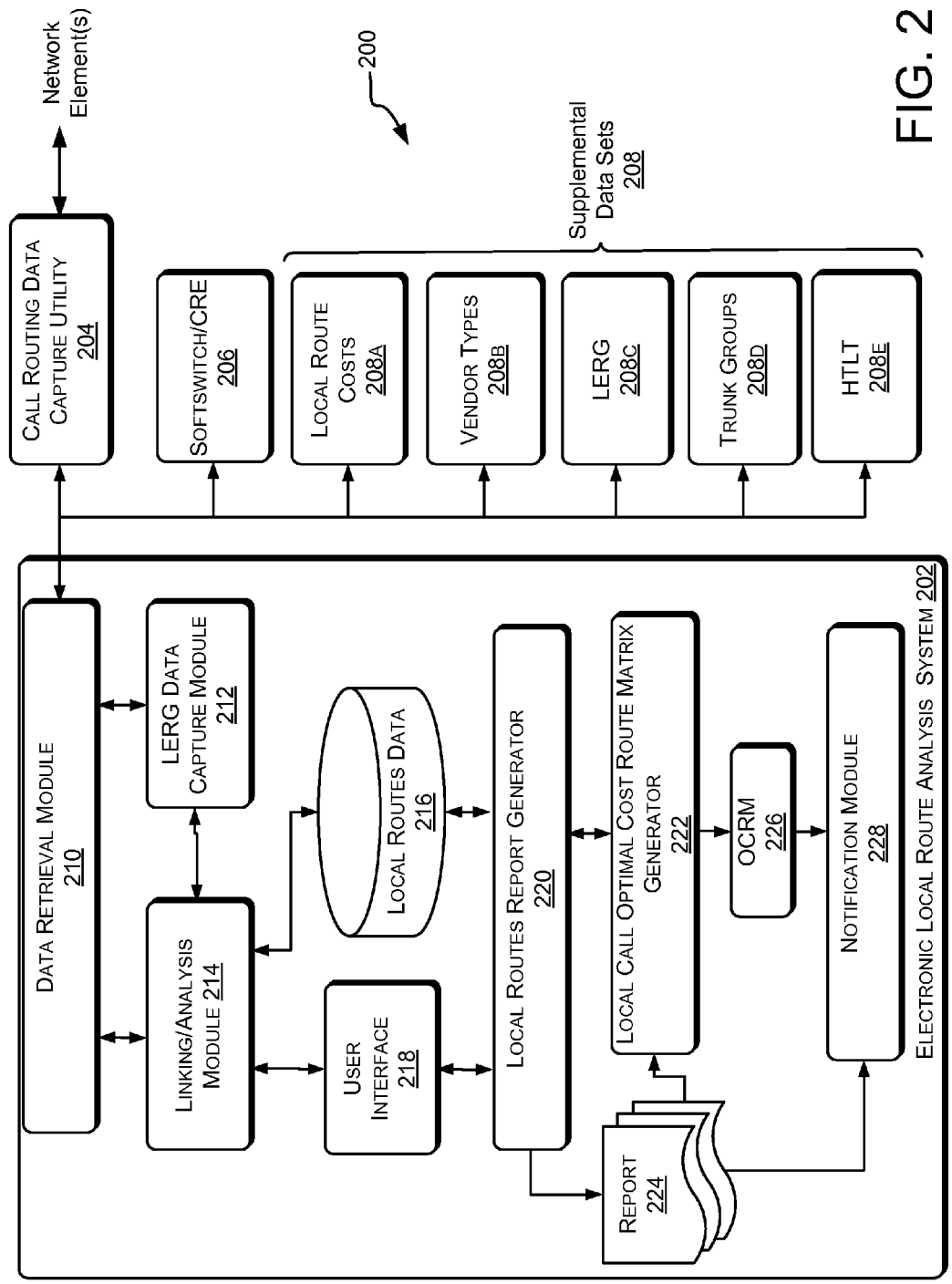
FIG. 2 is a functional module diagram illustrating a system for gathering CDR data, and analyzing local call routes using supplemental data.

FIG. 2 illustrates a system 200 configured to analyze local call routes based on captured call detail record (CDR) data and one or more sets of supplemental data. An electronic local call route analysis system 202 interacts with a call routing data capture utility 204 (which retrieves CDR data from one or more network elements), a softswitch or core routing engine (CRE) 206 and one or more sets of supplemental data 208 to gather data relevant to the analysis. Example supplemental data sets are local route costs 208*a*, vendor types 208*b*, local exchange routing guide (LERG) data 208*c*, and trunk groups 208*d*.

In the illustrated embodiment, the electronic local call route analysis system 202 includes a data retrieval module 210 configured to interface with the call routing data capture utility 204, CRE 206, and the supplemental data set(s) 208. The data retrieval module 210 generally includes one or more appropriate interfaces configured to communicate with the call routing data capture utility 204 and the one or more supplemental data set(s) 208. In some embodiments, the data retrieval module 210 includes data base access software, such as structured query language (SQL) modules, Access modules or others.

With particular regard to the LERG data 208*c*, a LERG data capture module 212 interacts with the data retrieval module 210 to gather specified data in the LERG. Because the data in the LERG relates particularly to local exchange network elements (e.g., end offices, switches, etc.), the LERG data capture module 212 may be configured to index into the LERG data 208*c* and properly interpret and navigate (e.g., through the data retrieval module 210) the LERG data 208*c*. The LERG data capture module 212 may be further operable to put together LERG tables including specified LERG data, such as, but not limited to, local access transport areas (LATAs), operating company numbers (OCNs), names of OCN owners, state, city, end office switches or remote hosts. Such LERG data can be included in views (e.g., tabular presentations) of local routes that are being used.

A linking and analysis module 214 analyzes retrieved data. Business rules and logic are used to analyze the local call attributes and link supplemental data to the attributes. Initially, the linking and analysis module 214 identifies local calls from data in the call routing data capture utility 204. HTLT data 206*e* can be accessed to determine whether a given pair of NPA-NXX's forms a local call. The linking and analysis module 214 gathers partition data from softswitch/CRE 206. Partition data includes route plans, which specify local routes. In various embodiments, the local route data is distinguished from any long distance route data when retrieving partition data.

Figure 3:
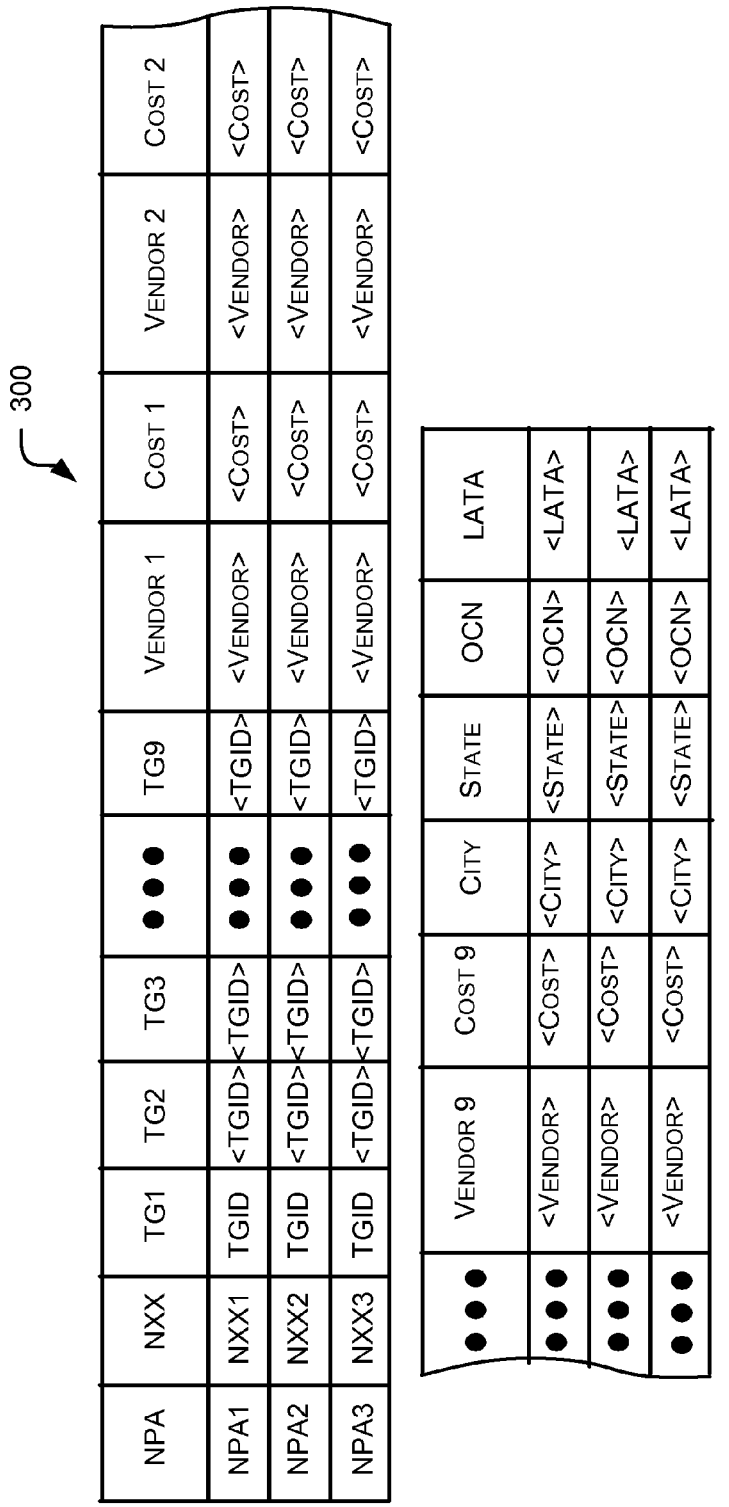
FIG. 3 illustrates a local call route analysis table that may be generated by an embodiment of the present invention.

Part of the analysis involves linking attributes from local call route data retrieved from the call routing data capture utility 204 with attributes from the supplemental data set(s) 208. For example, route costs, vendors, minutes of use, vendor types and trunk group identifiers may be linked with associated terminating NPA-NXX's. Example tables are shown in FIG. 3 and discussed below.

The linking and analysis module 214 stores tables of local call routing data in local routes data 216. The local routes data 216 can be organized in any number of fashions and may include numerous types of attributes (e.g., terminating NPA-NXX, originating NPA-NXX, MOUs, trunk group identifiers, call routing costs, vendors and vendor types) which may be associated with local routes.

A user interface 218 enables users to enter input specifying what types of attributes are gathered and analyzed, the organization of the attribute data and the appearance or layout of local route data reports. A local routes report generator 222 takes attributes and user input and generates local call routing reports. Local call routing reports 224 and local routes data 216 can be used by a local call optimal cost route matrix (OCRM) generator 222. The local call OCRM generator 222 generates an OCRM 226 that includes a list of local routes organized in order from least to most costly for each pair of originating NPA-NXX and terminating NPA-NXX.

A notification module 228 is operable to notify network personnel of the reports 224 and/or the OCRM 226. For example, network personnel at the network operations center may be notified of the OCRM 226 and reports 224 or changes thereto. Managers may also be notified in order to make decisions about route costs; for example, allocating more funds to increase the bandwidth at various connection points. Notification may be on a periodic basis and/or event driven basis. Notifications may be sent via email, text messaging or otherwise.

FIG. 3 illustrates an example local route analysis table 300 that may be generated by a local call route analysis system. The table includes a first column listing area codes/local exchange numbers (NPA-NXXs) associated with local calls. Multiple trunk group columns are next, showing trunk group identifiers (TGIDs) associated with the NPA-NXXs. In this embodiment, there are up to nine trunk groups for each NPA-NXX.

Following the trunk groups are columns showing vendor names and associated costs associated with the NPA-NXX's. In this embodiment, up to nine pairs of vendor/cost attributes are included. After the vendor/cost pairs are the names of cities, states, operating company number (OCN) and local access transport areas (LATAs) associated with the NPA-NXX's. The cities, states, OCN and LATAs can be obtained from the LERG, for example by the LERG data capture module 212, FIG. 2.

Figure 4:
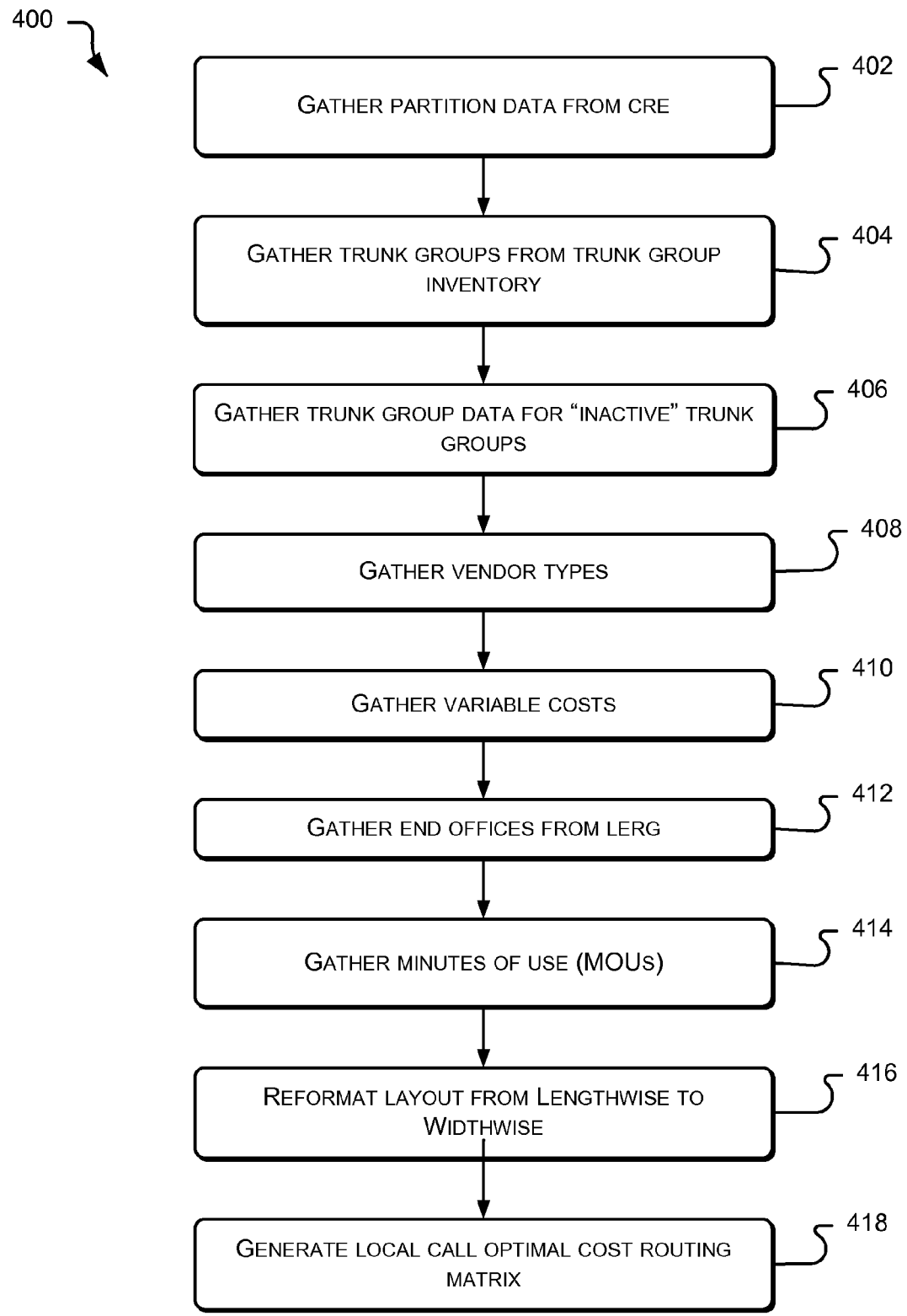
FIG. 4 is a flowchart illustrating a process for gathering local call route attributes and analyzing the attributes including linking supplemental data with local routes.

FIG. 4 is a flowchart illustrating a local call routing analysis process 400 for analyzing local call routing. The local call routing analysis process gathers data from multiple sources and analyzes a history of local calls that have been routed through the network. The local call routing analysis process 400 can be carried out by a local call routing analysis system, such as local call routing analysis system 144, or a similarly configured system.

In a first gathering operation 402, partition data is gathered from a softswitch or a core routing engine of a softswitch or similar network element configured to route calls. Partitions may be related to service levels or other aspects of customer service. Examples of partitions are discussed in detail in copending and commonly assigned United States Patent Application US Patent Publication No. 2009/0074173 and US Patent Publication No. 2009/0080630 both entitled "LOCAL ROUTING MANAGEMENT IN A TELECOMMUNICATIONS NETWORK", which are incorporated herein by reference for all purposes.

In gathering operation 402, the partition information is gathered and ordered by NPA-NXX. Example Structured Query Language (SQL) software for carrying out the gathering operation 402 is shown below:

```
SELECT  *FROM  (SELECT  DISTINCT
a.PARTITION_ID,  a.NPANXX,  a.ROUTING_LABEL_ID,
b.NESTED_LABEL,  b.SEQUENCE  as  SEQUENCE_1,
c.TRUNK, c.SEQUENCE  as SEQUENCE_2
    FROM  (qpt_AllRoutes_LRM_1  a  LEFT  JOIN
qpt_OnNetTP_3  b  ON  a.ROUTING_LABEL_ID  =
b.TOP_LEVEL_LABEL)
    LEFT JOIN qpt_Nested_4 c  ON  b.NESTED_LABEL=
c.NESTED_LABEL)  UNION  ALL  (SELECT DISTINCT
d.PARTITION_ID,  d.NPANXX,  d.ROUTING_LABEL_ID,
e.NESTED_LABEL,  e.SEQUENCE  as  SEQUENCE_1,
f.TRUNK, f.SEQUENCE as SEQUENCE_2
    FROM  (qpt_AllRoutes_LRM_1  d  LEFT  JOIN
qpt_OffNet_2  e  ON  d.ROUTING_LABEL_ID  =
e.TOP_LEVEL_LABEL)
    LEFT JOIN qpt_Nested_4 f ON e.NESTED_LABEL =
f.NESTED_LABEL)  ORDER  BY  NPANXX,
SEQUENCE_1, SEQUENCE_2;
```

In another gathering operation 404, active trunk group identifiers are gathered from a trunk group inventory. Gathering operation 404 gathers active trunk group identifiers and orders them by NPA-NXX. In another gathering operation 406, inactive trunk group identifiers of inactive trunk groups are gathered and ordered according to NPA-NXX. Gathering inactive trunk group identifiers can show routes in which trunk groups that are supposed to be inactive may actually be in use on the network. Such a situation can alert network personnel to the need to investigate why supposedly inactive trunk groups are being used in local routing, and to make changes if necessary.

In another gathering operation 408, vendor types are gathered. Terminating vendors are first obtained from the call routing capture utility (e.g., call routing capture utility 140, FIG. 1). Then a vendor type table is accessed to determine the type of vendor (e.g., off-net wats, co-carrier, etc).

In another gathering operation 410 variable costs are gathered for all the local calls in the call routing data capture utility. The variable costs may be obtained from the data capture utility itself (which may be loaded with the costs), or variable costs may be stored in another database where they may be retrieved. The variable costs are associated with the originating and terminating NPA-NXX.

In another gathering operation 412, end office and/or other switch information are gathered from the local exchange routing guide (LERG). As discussed herein, LERG data that may be gathered includes, but is not limited to LATAs, OCNs, names of OCN owners, cities, states, end office switches or remote hosts. Of course, other data in the LERG may be gathered as well and included in views of local calling routes. In another gathering operation 414, minutes of use are gathered for NPA-NXX's associated with local calls captured in the call routing data capture utility.

In a formatting operation 416, NPA-NXX data is formatted in a "widthwise" fashion, in which all vendors, costs, MOUs, and other data are listed in association with each NPA-NXX. This is in contrast to the typical "lengthwise" organization (which may be present in the call routing data capture utility) in which each NPA-NXX is listed multiple times—once for each vendor, cost, etc. Such a widthwise organization reduces the number of rows significantly. For example, in an embodiment, the number of rows in a lengthwise table is 3,410,000, whereas in a widthwise format, the number of rows is 155,000 rows. Examples of widthwise and lengthwise formatting are shown in the tables below:

TABLE 1

Lengthwise Organization

| NPA/NXX | Vendor Name | Cost |
| --- | --- | --- |
| NPA/NXX1 | VENDOR1 | COST1 |
| NPA/NXX1 | VENDOR2 | COST2 |
| NPA/NXX1 | VENDOR3 | COST3 |
| NPA/NXX1 | VENDOR4 | COST4 |
| NPA/NXX1 | VENDOR5 | COST5 |

TABLE 2

Widthwise Organization

| NPA/NXX | Vendor 1 | Cost 1 | Vendor 2 | Cost 2 | Vendor 3 | Cost 3 | ... |
| --- | --- | --- | --- | --- | --- | --- | --- |
| NPA/NXX1 | VENDOR1 | COST1 | VENDOR2 | COST2 | VENDOR3 | COST3 | ... |
| NPA/NXX2 | VENDOR1 | COST1 | VENDOR2 | COST2 | VENDOR3 | COST3 | ... |
| NPA/NXX3 | VENDOR1 | COST1 | VENDOR2 | COST2 | VENDOR3 | COST3 | ... |
| NPA/NXX4 | VENDOR1 | COST1 | VENDOR2 | COST2 | VENDOR3 | COST3 | ... |
| NPA/NXX5 | VENDOR1 | COST1 | VENDOR2 | COST2 | VENDOR3 | COST3 | ... |

In the above example tables, only vendors and costs are shown for illustration purposes, but in actual operation, typically numerous other attributes will be organized and stored in association with each NPA-NXX, including, for example, minutes of use (MOUs), trunk group IDs, city, state, LATA, OCN, etc. Using the local call routing views, such as those shown above, network personnel can readily determine numerous attributes of local routes that are being used to set up local calls. Based on such information, it may be determined that certain routes that are being used or certain attributes of routes are not optimal based on cost. Network personnel can then determine changes that should be made to switch settings (e.g., partitions, routes plans) in order to make local routing of calls more optimal according to cost.

In a generating operation 418, the data in the table of operation 416 can be used to generate an optimal cost routing matrix for local calls. For example, the vendors for each terminating NPA-NXX can be prioritized according to their cost; e.g., with the least cost vendors being first. Numerous other decision criteria or business rules can be used to influence the generation of an OCRM, particularly in light of the local call routing data.

Figure 5:
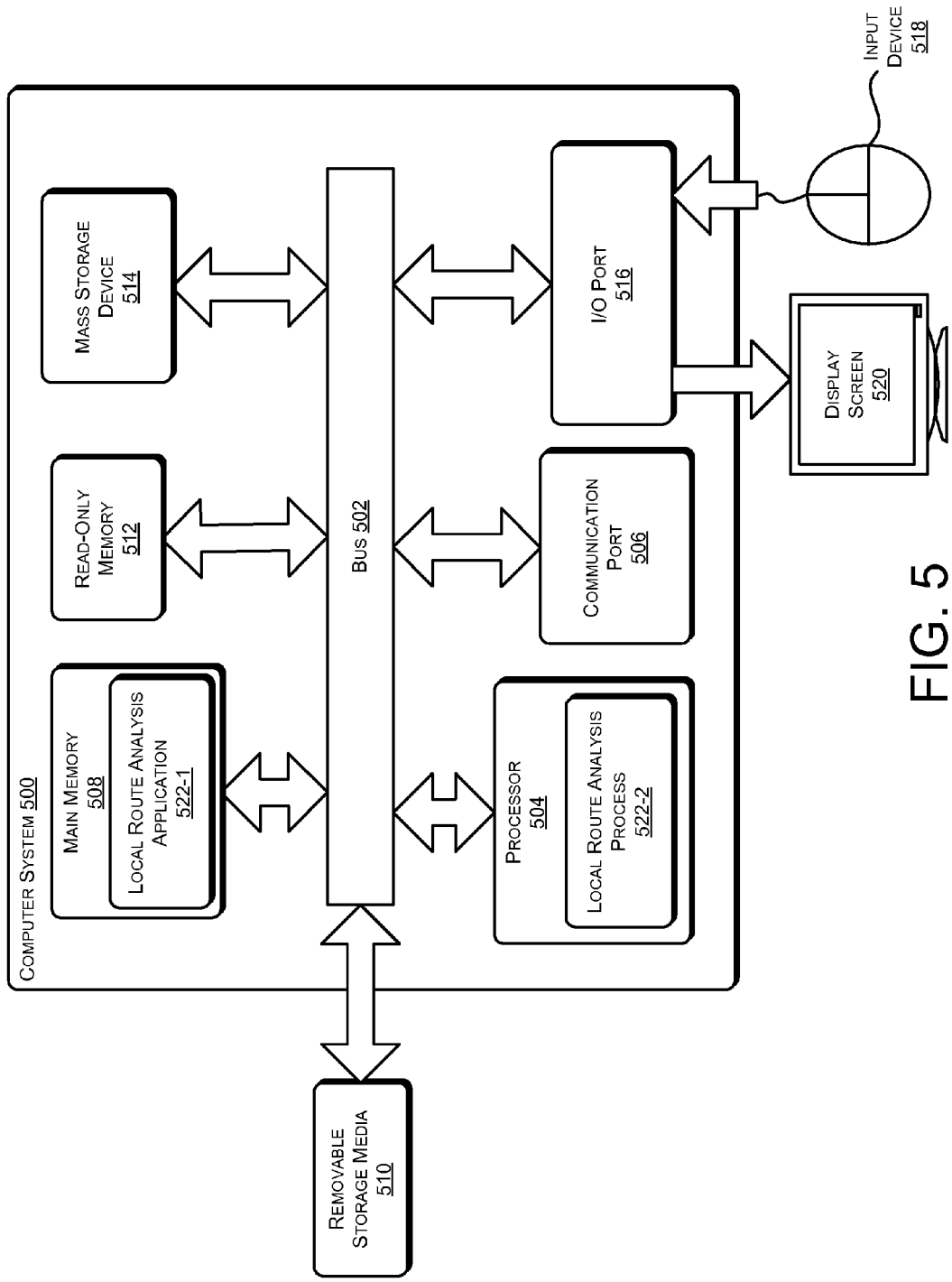
FIG. 5 is an example block diagram of a computer system configured with a local route analysis application and process according to embodiments herein.

FIG. 5 is a schematic diagram of a computer system 500 upon which embodiments of the present invention may be implemented and carried out. For example, one or more computing devices 500 may be used to retrieve and filter call detail record (CDR) data, link CDR data entries to supplemental data and/or analyze local call routes associated with the CDR data. Computer system 500 generally exemplifies any number of computing devices, including general purpose computers (e.g., desktop, laptop or server computers) or specific purpose computers (e.g., embedded systems).

According to the present example, the computer system 500 includes a bus 502 (i.e., interconnect), at least one processor 504, at least one communications port 506, a main memory 508, a removable storage media 510, a read-only memory 512, and a mass storage 514. Processor(s) 504 can be any known processor, such as, but not limited to, an Intel® Itanium® or Itanium 2® processor(s), AMD® Opteron® or Athlon MP® processor(s), or Motorola® lines of processors. Communications ports 506 can be any of an RS-232 port for use with a modem based dial-up connection, a 10/100 Ethernet port, a Gigabit port using copper or fiber, or a USB port. Communications port(s) 506 may be chosen depending on a network such as a Local Area Network (LAN), a Wide Area Network (WAN), or any network to which the computer system 500 connects. The computer system 500 may be in communication with peripheral devices (e.g., display screen 530, input device 518) via Input/Output (I/O) port 516.

Main memory 508 can be Random Access Memory (RAM), or any other dynamic storage device(s) commonly known in the art. Read-only memory 512 can be any static storage device(s) such as Programmable Read-Only Memory (PROM) chips for storing static information such as instructions for processor 504. Mass storage 514 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, or Universal Serial Bus (USB) based system bus (or other) depending on the storage devices used. Removable storage media 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 508 is encoded with local route analysis application 522-1 that supports functionality as discussed herein. For example, a local route analysis application 522-1 can include one or more of the linking/analysis module 214, the LERG data capture module 212, the local routes report generator 220 and the local call OCRM generator 222 of FIG. 2. Local route analysis application 522-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 508 via the use of bus 502 in order to launch, run, execute, interpret or otherwise perform the logic instructions of the local route analysis application 522-1. Execution of local route analysis application 522-1 produces processing functionality in local route analysis process 522-2. In other words, the local route analysis process 522-2 represents one or more portions of the local route analysis application 522-1 performing within or upon the processor(s) 504 in the computer system 500.

It should be noted that, in addition to the local route analysis process 522-2 that carries out operations as discussed herein, other embodiments herein include the local route analysis application 522-1 itself (i.e., the un-executed or non-performing logic instructions and/or data). The local route analysis application 522-1 may be stored on a computer readable medium (e.g., a repository) such as a floppy disk, hard disk or in an optical medium. According to other embodiments, the local route analysis application 522-1 can also be stored in a memory type system such as in firmware, read only memory (ROM), or, as in this example, as executable code within the main memory 508 (e.g., within Random Access Memory or RAM). For example, local route analysis application 522-1 may also be stored in removable storage media 510, read-only memory 512, and/or mass storage device 514.

Example functionality supported by computer system 500 and, more particularly, functionality associated with local route analysis application 522-1 and local route analysis process 522-2 is discussed above with reference to FIGS. 1-4.

In addition to these embodiments, it should also be noted that other embodiments herein include the execution of the local route analysis application 522-1 in processor(s) 504 as the local route analysis process 522-2. Thus, those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer-implemented method for analyzing locally routed phone calls, the method comprising:
   retrieving call routing information from a call data records (CDR) collector operable to collect call detail records from a plurality of network elements in a network, wherein the call routing information indicates how a plurality of calls were terminated through the network;
   retrieving call setup costs associated with a plurality of calls from the CDR collector, wherein the CDR collector is further operable to attribute costs to the plurality of calls setup up across a network;
   retrieving local trunk groups from a local trunk group inventory;
   associating vendor types with calls identified in the call routing information;
   associating local trunk groups with calls identified in the call routing information; and
   based on the local trunk groups, the call setup costs and the vendor types, generating view of local calls setup through the network, wherein the view associates area code/local exchange numbers (NPA-NXX's) with information.

2. The computer-implemented method of claim 1, wherein the information associated with the area code/local exchange numbers (NPA-NXX's) is selected from the group consisting of: terminating trunk groups, terminating vendors, and call setup costs.

3. The computer-implemented method of claim 2, wherein the view further includes minutes of use and partition identifiers.

4. The computer-implemented method of claim 2, further comprising generating an optimal cost routing matrix identifying a plurality of routes for a plurality of calls in a prioritized manner.

5. The computer-implemented method of claim 4, further comprising provisioning the plurality of network elements with routes from the optimal cost routing matrix to enable prioritized optimal cost local routing of calls.

6. A system for routing local calls through a network, the system comprising:
   a call detail records (CDR) collector operable to gather call detail records identifying a plurality of calls set up throughout a network and associate a cost with each identified call;
   a trunk group inventory storing a plurality of local trunk groups that calls can be terminated on; and
   a local call optimal cost routing matrix generator operable to retrieve selected call setup data from the CDR collector, identify local calls using the trunk group inventory and generate an optimal cost routing matrix associating a plurality of local calls with local routes in a prioritized manner, wherein the optimal cost routing matrix further associates the local calls with information.

7. The system of claim 6, further comprising a local mapping utility operable to map area code/local exchange numbers (NPA-NXX's) to other NPA-NXX's that constitute local calls.

8. The system of claim 6, further comprising a vendor type table that associates vendor types with terminating vendor identifiers of the CDRs.

9. The system of claim 6, wherein the optimal cost routing matrix associates each of a plurality NPA-NXX's with one or more costs and routes in a prioritized manner.

10. The system of claim 6, further comprising one or more network elements, wherein one or more routes of the optimal cost routing matrix are provisioned onto the one or more network elements.

11. The system of claim 6, further comprising an override inventory storing a one or more override routes for each call, wherein each of the one or more overrides is an alternative route irrespective of route cost.

12. The system of claim 6, wherein the information associated with the local calls is selected from the group consisting of: terminating trunk groups, terminating vendors, and call setup costs.

13. A computer program product including non-transitory computer-readable media having stored thereon computer-executable instructions, which, when executed by a computer cause the computer to carry out a process comprising:
gathering local call attributes from a call detail record capture utility;
linking supplemental attributes to the local call attributes, wherein linking supplemental attributes to the local call attributes comprises linking are code/local exchange numbers (NPA-NXX's) of local calls with associated vendor names, routes costs and trunk group identifiers;
generating a local call report, which associates local call routes with a plurality of attributes; and
generating a local call optimal cost routing matrix based on the associations between local call route costs and local call attributes.

14. The computer program product of claim 13, the process further comprising determining minutes of use associated with each of a plurality of local call routes.

* * * * *